(12) United States Patent
Masad et al.

(10) Patent No.: US 10,277,806 B2
(45) Date of Patent: Apr. 30, 2019

(54) AUTOMATIC IMAGE COMPOSITION

(71) Applicant: ARTINCAM LTD., Herzelia (IL)

(72) Inventors: Ofri Masad, Netanya (IL); Ariel Shamir, Jerusalem (IL)

(73) Assignee: ARTINCAM LTD., Herzelia (IL)

( * ) Notice: Subject to any disclaimer, the term of this patent is extended or adjusted under 35 U.S.C. 154(b) by 0 days.

(21) Appl. No.: 15/326,492

(22) PCT Filed: Jun. 28, 2015

(86) PCT No.: PCT/IL2015/050665
§ 371 (c)(1),
(2) Date: Jan. 15, 2017

(87) PCT Pub. No.: WO2016/009421
PCT Pub. Date: Jan. 21, 2016

(65) Prior Publication Data
US 2017/0208243 A1 Jul. 20, 2017

Related U.S. Application Data

(60) Provisional application No. 62/026,057, filed on Jul. 18, 2014.

(51) Int. Cl.
*H04N 5/232* (2006.01)
*G06T 11/60* (2006.01)
(Continued)

(52) U.S. Cl.
CPC ..... *H04N 5/23222* (2013.01); *G06K 9/00684* (2013.01); *G06K 9/00818* (2013.01);
(Continued)

(58) Field of Classification Search
CPC . H04N 5/23222; G06K 9/00684; G06T 11/60
(Continued)

(56) References Cited

U.S. PATENT DOCUMENTS 8,508,622 B1    8/2013  Anon
2003/0044078 A1*  3/2003  Joshi ................. G06T 9/008
                                        382/243
(Continued)

OTHER PUBLICATIONS

International Search Report for PCT/IL2015/050665 Completed Dec. 14, 2015; dated Dec. 21, 2015 3 pages.
(Continued)

*Primary Examiner* — Lin Ye
*Assistant Examiner* — Chan T Nguyen
(74) *Attorney, Agent, or Firm* — The Roy Gross Law Firm, LLC; Roy Gross

(57) ABSTRACT

A method comprising using at least one hardware processor for: receiving a continuous stream of images; and in real time, for each image of some of the images: extracting composition features from the image, determining photographic composition functions for at least some of the extracted composition features based on a plurality of composition rules, defining a photographic composition sum-function by summing up at least some of the photographic composition functions, and calculating an extremum of the photographic composition sum-function, wherein the extremum reflects a photographic composition suggestion with respect to a photographic composition of the image.

20 Claims, 4 Drawing Sheets

(51) Int. Cl.
*G06K 9/32* (2006.01)
*G06K 9/00* (2006.01)
(52) U.S. Cl.
CPC ............ *G06K 9/3233* (2013.01); *G06T 11/60* (2013.01); *H04N 5/23219* (2013.01)
(58) Field of Classification Search
USPC .................................................. 348/207.11
See application file for complete search history.

(56) References Cited

U.S. PATENT DOCUMENTS

2009/0274370 A1   11/2009  Sakamoto et al.
2009/0278958 A1   11/2009  Bregman-Amitai et al.
2015/0098000 A1*  4/2015  Gosangi ............. H04N 5/23293
                                                      348/333.02

OTHER PUBLICATIONS

Written Opinion for PCT/IL2015/050665 Completed Dec. 14, 2015; dated Dec. 21, 2015 4 pages.

* cited by examiner

AUTOMATIC IMAGE COMPOSITION

BACKGROUND

The present invention relates to the field of digital photography.

In the past years, digital cameras have become widely spread among unprofessional users, mainly due to cellular phone distribution. To assist amateur users produce higher quality images from their cameras, camera application developers introduced many automatic features such as auto-focus, auto-exposure, auto white-balance, auto-flash mode, face detection and more.

Image composition plays a key role in the quality assessment of photographs and images. It is a common belief that the importance of good photo composition could not be overestimated. This fact is long known to professional photographers and taught in most photography courses and textbooks.

The art of composition deals with the arrangement of objects and settings in images and photographs. It is commonly practiced by most professional photographers and studied in art and photography schools as one of the most fundamental pillars of photography. It includes some basic principles and a few dozen composition rules, which may be applied in different scenarios. Some known composition rules are the rule of thirds, the rule of diagonals, the rule of space, the golden ratio rule, the rule of secondary diagonals, the central composition rule and the symmetric composition rule. A brief of the principles of these exemplary rules are disclosed herein below.

According to the rule of thirds, all vertical or horizontal prominent lines, or approximate lines (i.e., lines having curves but which may be perceived by humans as straight), in an image should be aligned with the top or bottom third lines of the frame of the image (for horizontals), or the left or right third lines of the frame (for verticals). Main objects or interesting objects in the image should be positioned on one of the image's power points, which are the four intersection points of the horizontal and vertical third-lines. The golden ratio rule resembles the rule of thirds. The main difference is that, instead of dividing the image into thirds, it is divided using the golden ratio (1:1.618).

According to the rule of diagonals, a prominent line, or an approximate line, in an image should be aligned with one of the image's two main diagonals or one of the four secondary diagonals (45° lines originating from the four corners). According to the rule of secondary diagonals, four secondary diagonals may be defined in an image. Like the diagonals rule, this rule suggests that placing prominent lines in the image over these four lines may produce a more aesthetic image.

According to the rule of space, a space (background area) should be kept in front of objects which have a certain direction of movement (such as cars, bicycle or a dog) or in front of people looking or moving in some direction.

According to the centered composition rule, if an object is occupying a relatively large portion of the image or if the image does not include other salient details, then the object center of mass should be placed in the center or the image or slightly under the center of the image.

According to the symmetric composition rule, if an image holds a strong linear symmetry, the symmetry axis should be placed such that it may cross the image center.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a continuous stream of images; and in real time, for each image of at least some of the images: extracting composition features from the image, determining photographic composition functions for at least some of the extracted composition features based on a plurality of composition rules, defining a photographic composition sum-function by summing up at least some of the photographic composition functions, and calculating an extremum of the photographic composition sum-function, wherein the extremum reflects a photographic composition suggestion with respect to a photographic composition of the image.

There is further provided, in accordance with an embodiment, a computer program product comprising a non-transitory computer-readable storage medium having program code embodied therewith, the program code executable by at least one hardware processor to: receive a continuous stream of images; and in real time, for each image of at least some of the images: extract composition features from the image, determine photographic composition functions for at least some of the extracted composition features based on a plurality of composition rules, define a photographic composition sum-function by summing up at least some of the photographic composition functions, and calculate an extremum of the photographic composition sum-function, wherein the extremum reflects a photographic composition suggestion with respect to a photographic composition of the image.

There yet further is provided, in accordance with an embodiment, a computerized device comprising: a camera; and a hardware processor configured to: (a) receive a continuous stream of images; (b) in real time, for each image of at least some of the images: extract composition features from the image, determine photographic composition functions for at least some of the extracted composition features based on a plurality of composition rules, define a photographic composition sum-function by summing up at least some of the photographic composition functions, and calculate an extremum of the photographic composition sum-function, wherein the extremum reflects a photographic composition suggestion with respect to a photographic composition of the image.

There is provided in accordance with yet another embodiment, a method comprising using at least one hardware processor for: receiving an image; extracting composition features from the image; determining photographic composition functions for at least some of the extracted composition features based on a plurality of composition rules; defining a photographic composition sum-function by summing up at least some of the photographic composition functions; and calculating an extremum of the photographic composition sum-function, wherein the extremum reflects a photographic composition suggestion with respect to a photographic composition of the image.

In some embodiments, the method further comprises using the at least one hardware processor for presenting the photographic composition suggestion to a user.

In some embodiments, the presenting of the photographic composition suggestion to the user comprises superimposing the photographic composition suggestion on one or more of the images.

In some embodiments, the photographic composition suggestion comprises a suggestion with respect to characteristics of a camera used to capture the image, wherein the characteristics are selected from the group consisting of: a zoom of the camera, an alignment of the camera and a rotation of the camera.

In some embodiments, each of the photographic composition functions is based on a composition rule of the plurality of the composition rules and is determined for one or more composition features of the at least some of the extracted composition features.

In some embodiments, the method further comprises using said at least one hardware processor for receiving one or more indications as to one or more points of interest in the image, and wherein the extracting of composition features further comprises extracting composition features relating to the one or more points of interest in the image.

In some embodiments, the method further comprises using said at least one hardware processor for classifying the image by a scene type.

In some embodiments, rules of the plurality of composition rules are selected from the group consisting of: the rule of thirds, the rule of diagonals, the rule of space, the rule of golden ratio, the rule of secondary diagonals, the rule of centered composition and the rule of symmetric composition.

In some embodiments, the photographic composition functions comprise continuous functions.

In some embodiments, the defining of the photographic composition sum-function comprises assigning the at least some of the photographic composition functions with weights, wherein the weights are based on a relative importance of elements selected from the group consisting of: (a) the composition features for which the photographic composition functions are determined, and (b) the composition rules on which the photographic composition functions are based.

In some embodiments, the method further comprises using said at least one hardware processor for downsampling the image.

In some embodiments, the program code is further executable by said at least one hardware processor to present the photographic composition suggestion to a user.

In some embodiments, said program code is further executable by said at least one hardware processor to classify the image by a scene type, and wherein the plurality of composition rule is a set of rules corresponding to the scene type.

In some embodiments, the hardware processor is further configured to present the photographic composition suggestion to a user.

In some embodiments, the computerized device further comprises a display, wherein the presenting of the photographic composition suggestion to the user comprises superimposing the photographic composition suggestion on one or more of the images displayed on the display.

In some embodiments, the method further comprises using said at least one hardware processor for presenting the photographic composition suggestion to a user.

In some embodiments, the image is a preview image of a desired scene and the suggested photographic composition is calculated in real-time and iteratively, every time another preview image of the desired scene is received.

In some embodiments, the method further comprises using said at least one hardware processor for receiving one or more indications as to one or more points of interest in the image, and wherein the extracting of composition features further comprises extracting composition features relating to the one or more points of interest in the image.

In some embodiments, the method further comprises using said at least one hardware processor for classifying the image by a scene type.

In some embodiments, the photographic composition functions comprise continuous functions.

In some embodiments, the method further comprises using said at least one hardware processor for downsampling the image.

In some embodiments, the method further comprises using the at least one hardware processor for: initially cropping the received image; and applying the photographic composition suggestion on the initially cropped image by cropping the initially cropped image accordingly.

In some embodiments, the suggested photographic composition is calculated and applied on the initially cropped image iteratively.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
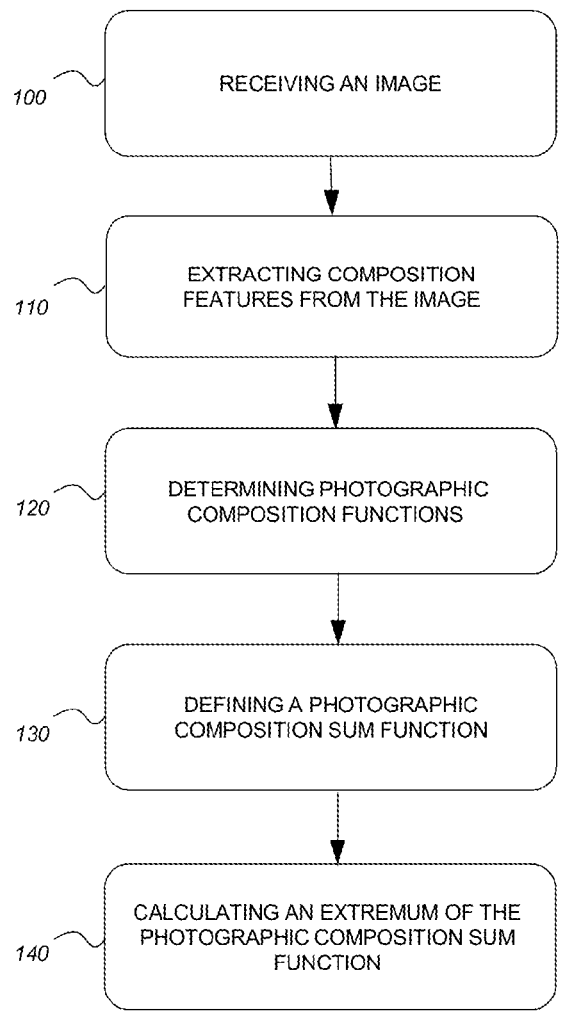
FIG. 1 shows a flowchart of an exemplary method, constructed and operative in accordance with an embodiment of the disclosed technique.

Disclosed herein are systems, methods and computer program products for automatically suggesting an improved photographic composition for a captured image. The disclosed systems, methods and computer program products may assist untrained unprofessional photographers to improve their everyday images by utilizing an automatic algorithm for digital cameras that may suggest corrections for better image composition based on the image content, specifically in real-time. The algorithm may detect various features in a captured image such as salient regions, prominent lines, principal component lines and/or faces, and produce a composition suggestion, e.g., in the form of zoom and/or alignment directions for a user of the camera. The algorithm may use several well-known composition rules as well as some empirical rules, which may be deduced from researching aesthetic images and various image features, but encapsulates them all into a single suggestion. This suggestion may be superimposed on (namely, presented as a layer on top of) the camera preview in an intuitive manner, so that even a user who does not have any previous knowledge in photo composition may follow the suggestion.

The disclosed systems, methods and computer program products may operate or be applied in real-time as an infinite iterative loop that operates on a continuous camera preview stream (i.e., a stream of preview images). In each iteration, the current image from the camera preview may be captured and processed accordingly. A composition suggestion is then presumably presented to the user, which may change or move the camera view. Once a new image is captured, the process restarts again.

Applying different composition rules to different features may result in contradictory suggestions on how to improve photographic composition. Advantageously, the disclosed systems, methods and computer program products may allow composing multiple rules and with respect to multiple features together into one function that may produce a single suggestion for the user at any given time.

The term "real time", as referred to herein with respect to performing computing operations, may relate to performing the computing operations immediately, e.g., once an event occurs, guaranteeing response within strict time constraints. The time constraints may include a timeframe of hundreds of milliseconds, such as 300, 250, 200, 150 and 100 milliseconds or less.

The term "camera", as referred to herein, may relate to a digital camera including at least an image sensor, such as a CCD (Charge-Coupled Device) or a CMOS (Complementary Metal-Oxide Semiconductor) sensor; a lens assembly; and a processor. Optionally, the camera also incorporates, whether in its housing or externally, a digital display on which images captured by the image sensor, and/or other information, may be displayed.

A camera typically displays, in real time, what its sensor captures, i.e., a stream of images. The term "recorded image", as referred to herein, may relate to one sample (i.e., image) captured by the sensor, encoded and saved as a digital image file in a non-volatile memory. The term "preview image", as referred to herein, may relate to one sample captured by the sensor, displayed by the camera in real-time and not recorded in the camera memory (except for sometimes in a certain temporary memory, volatile or non-volatile). The term "image", as referred to herein, may relate to such a preview image and/or to such a recorded image.

The term "composition features", as referred to herein with respect to an image, may relate to features that may have implication on the composition of the image. Such features may be structures in the image, including structures ranging from simple structures, such as points, edges or lines, to more complex structures, such as objects, faces, people, sky, light sources, shapes defined in terms of curves or boundaries between different image areas, such as horizon or salient objects, or to properties of such an area or of the image, such as symmetry or scene type.

The term "user", as referred to herein, may relate to a person, an automatic platform such as an automatic camera (i.e., a camera which may automatically change its location and/or some other camera characteristics such as zoom), a robotic platform carrying a camera, or to software. Reference is now made to FIG. 1, which shows a flowchart of an exemplary method, constructed and operative in accordance with an embodiment of the disclosed technique. In a step 100, an image may be received. The image may be captured by a camera operated by a user. The camera may be embedded in a computerized device such as a smartphone or a tablet computer. The image may be a preview image, selected from a real-time stream of preview images, or a recorded image of a desired scene. When the method is applied in real-time, a continuous stream of images (i.e., preview images) may be received, for example by a hardware processor of the computerized device. The method may be then applied iteratively for each of the images or for some of the images (e.g., the stream of images may be sampled per demand (i.e., once an analysis of an image according to the disclosed methods is complete, the stream of images may be sampled again) or at a predefined rate.

In an optional step, a downsampling of the received image may be performed.

Downsampling of the image may be performed by using techniques such as nearest-neighbor interpolation, bilinear interpolation, bicubic interpolation and/or Lanczos interpolation. The following steps may be then performed on the downsampled image in order to allow a more efficient and faster analysis.

In a step 110, composition features may be extracted from the image. The composition features may be extracted by using known image processing techniques. Known image processing techniques which are adapted to run in real time may be used with respect to preview images. Such processing techniques may include line detection (e.g., Hough Transform, Probabilistic Hough Transform and/or Randomized Hough Transform), segmentation (e.g., watershed, flood fill, grab-cut, thresholding, k-means and/or region growing), salient region detection (e.g., Frequency-tuned salient region detection, Graph-based visual saliency, spectral residual saliency detection and/or context-aware saliency detection), face detection (e.g., Viola-Jones, convolutional Neural Networks, Haar Cascade, Histogram of Oriented Gradients (HOG) and/or Hausdorff Distance), scene classification (e.g., Support Vector Machine (SVM), deep neural network and/or k-Nearest Neighbors) and/or symmetry detection (e.g., feature mirroring, Multi-Scale Kernel Operators for Reflection and Symmetry-growing).

The extraction of composition features may include salient objects (also "regions") extraction using salient region detection and segmentation. For example, algorithms based on symmetric surround saliency detection and/or flood-fill, simple threshold and/or watershed techniques may be used. The result of salient objects extraction may be an object or a set of objects detected in the image, along with their properties such as their boundaries (also "contours" or "borders") and a numerical measure of saliency in the image.

The extraction of composition features may include face detection, which may be performed based on detection techniques such as Viola-Jones, convolutional Neural Networks, Haar Cascade, HOG and/or Hausdorff Distance. The product of face detection may be a face or a set of faces shown in the image. A face may be defined by properties such as its location, size, orientation and/or angle of gaze in the image.

The extraction of composition features may include people detection (i.e., the full body of the people as opposed to only their faces), which may be performed based on detection techniques such as Viola-Jones, convolutional Neural Networks, Haar Cascade, HOG and/or Centrist. The product of people detection may be the region including a person or a set of people shown in the image, which may include properties such as the people's locations and/or sizes in the image.

The extraction of composition features may include line detection, which may be performed based on line detection techniques such as Hough Transform. The product of line detection may be a line or a set of lines shown in the image, which may include properties such as their location (e.g., start and end points), their support (i.e., how well the actual image matches the defined line) and/or their strength (i.e., how contrasted are the surfaces on the two sides of the line).

The extraction of composition features may include symmetry detection, which may be performed based on techniques such as edge matching and/or feature mirroring. The product of symmetry detection may be one or more symmetries detected in the image, which may include properties such as a location of one or more detected symmetry axes and/or symmetry accuracy (i.e., how similar are the two symmetric portions with respect to a symmetry axis). For example, the symmetry may be around an X axis (i.e., a horizontal axis with respect to the image) and/or a Y axis (i.e., a vertical axis with respect to the image).

The extraction of composition features may include scene detection, which may be performed, for example, based on machine learning techniques such as Support Vector Machine (SVM), deep neural network and/or k-Nearest Neighbors algorithm. The result of scene detection may be the type of the scene shown in the image. Scene types may include specific types of places such as a beach, a forest, a mountain, a city etc., and/or general types such as indoor scene (in general, and/or a specific indoor scene such as a party) or outdoor scene. Scene detection may include an offline learning stage where composition features may be used as input to a machine-learning algorithm such as Support Vector Machine or Neural Networks to create a classification algorithm. Such classification algorithm may be used for the detection of scene type.

In a step 120, photographic composition functions for at least some of the extracted composition features may be determined, based on a plurality of composition rules. Each of the photographic composition functions may be based on a specific composition rule and may be determined for one or more composition features. The composition rules may include known composition rules such as the rule of thirds, the rule of diagonals, the rule of space, the rule of golden ratio, the rule of secondary diagonals, the rule of centered composition, the rule of symmetric composition and/or the like. Furthermore, additional composition rules may be deduced and defined, such as a rule of clean perimeter. According to the rule of clean perimeter, a perimeter or a frame of an image (i.e., the circumscribing edge portion of the image) should be kept clean from foreground objects that may block a portion of the scene shown in the image.

Each composition rule may be defined as a photographic composition function or as a collection of such functions (e.g., a family of photographic composition functions). A photographic composition function may receive an argument of one or multiple dimensions. The value of the photographic composition function may provide a relative estimation of the argument (i.e., relative to the other arguments) with respect to the specific composition rule on which the photographic composition function is based. The argument of the photographic composition function may represent one or more characteristics of the image capturing or of the camera such as alignment of the camera, zoom of the camera and/or rotation or tilt of the camera. Thus, the values of such a function may provide relative estimations of all of the image composition options of the captured scene with respect to such a characteristic. An extremum point of the function may provide the best value for such a characteristic, as will be described in more details herein below. A photographic composition function may be, for example, a Gaussian function, a Gaussian Mixture function, a Radial Basis function or any bounded 2D scalar function. The estimations of the argument may be normalized such that the values of a photographic composition function may range from zero (e.g., the lowest estimation) to one (e.g., the highest estimation).

Photographic composition functions which represent an alignment of the camera may be continuous two-dimensional (2D) functions (i.e., functions having arguments of a domain of two dimensions), which may receive as input 2D arguments representing 2D locations in the image (x, y). Such functions may be indicated as: $f_i(x, y)$, where i represents an index of the functions. The location argument (x, y) may represent, for example, the location of a center of an image of a desired scene. The location of a center of an image of a desired scene reflects the alignment of the camera used to capture the image of the scene.

Figure 2C:
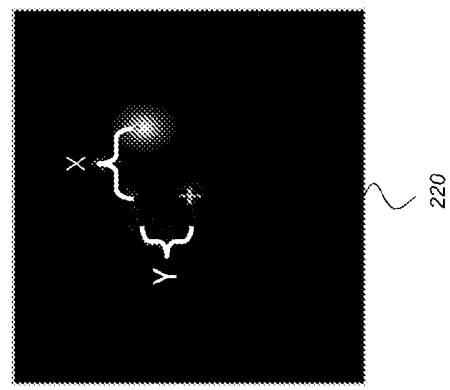
FIGS. 2A, 2B and 2C show grayscale maps representing 2D photographic composition functions, where darker gray values represent low function values and brighter gray values represent high function values.
Figure 2B:
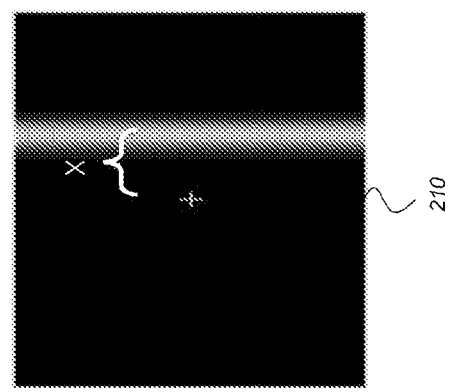
Figure 2A:
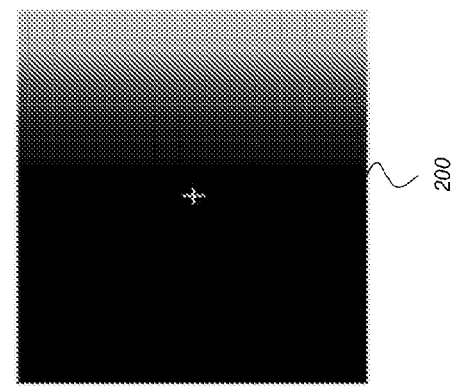

Reference is now made to FIGS. 2A, 2B and 2C, which show grayscale maps 200, 210 and 220 representing 2D photographic composition functions, where darker gray values represent low function values and brighter gray values represent high function values. A received image of a desired scene (i.e., according to step 100) is used as a reference image (i.e., the x, y coordinated are determined based on this image) and its center is marked with a "+" in grayscale maps 200, 210 and 220. Thus, according to grayscale map 200, a right edge portion of the image is indicated as the best location for a center of an image of the desired scene. According to grayscale map 210, a strip of the image located at its right half portion is indicated as the best location for a center of an image of the desired scene. According to grayscale map 220, a circular portion of the image located at its top right quarter is indicated as the best location for a center of an image of the desired scene.

Each rule may apply to one or more composition features which were detected and extracted from the image. Properties of the composition features, such as location, size, saliency and/or other properties may be used in order to define and tune the photographic composition functions which define the rule. For example, such properties may be used as parameters of the photographic composition functions. Thus, a family of photographic composition functions may be defined for a specific composition rule, where each function may be adapted to be applied on a different composition feature by embedding different parameters.

Figure 3A:
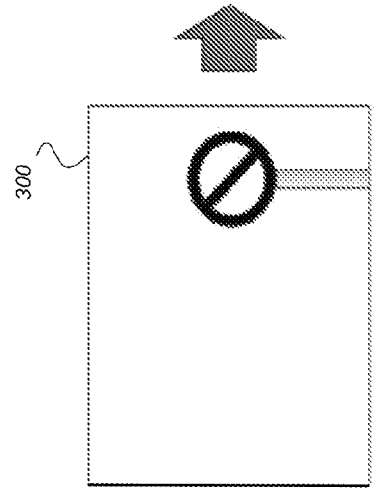
FIG. 3A, shows an exemplary image including a traffic sign.
Figure 3B:
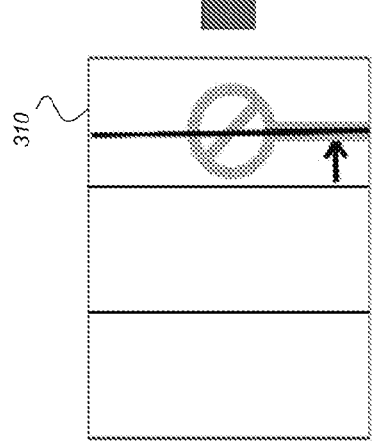
FIG. 3B shows the image of FIG. 2A having overlaid vertical third-lines according to the rule of thirds.
Figure 3C:
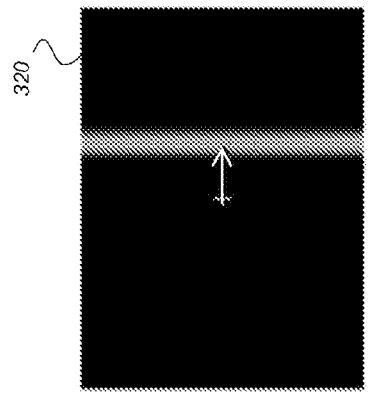
FIG. 3C shows a grayscale map representing a 2D photographic composition function defined based on the rule of thirds and determined for the stand of the traffic sign, where the color black represents low values of the 2D photographic composition function and the color white represents high values of the 2D photographic composition function.

Reference is now made to FIGS. 3A-3C. FIG. 3A shows an exemplary image 300 including a traffic sign. FIG. 3B shows the image of FIG. 3A having overlaid vertical third-lines according to the rule of thirds (indicated as image 310). FIG. 3C shows a grayscale map 320 of a 2D photographic composition function defined based on the rule of thirds and determined for the stand of the traffic sign, where darker gray values represent low function values and brighter gray values represent high function values.

In image 300 a vertical line (i.e., a feature) is detected. As shown in image 310, the line feature is located 0.2 of image 300 width to the right of the right third line. A 2D Gaussian function may be determined (i.e., a photographic composition function) such that its expected value equals to 0.2 of image 300 width to the right of image 300 center. Hence, the location property of this line feature is determined as a parameter of the photographic composition function, i.e., as the expected value of the Gaussian function. Such a function may, for example, satisfy the rule of thirds for prominent line features. Grayscale map 320 may represent the determined Gaussian function. One may see that the expected value of the function equals to the location described as 0.2 of image 300 width to the right of image 300 center. Image 300 center is indicated in image 320 by "+".

Figure 3D:
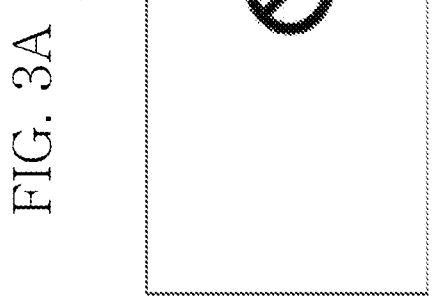
FIG. 3D, shows the exemplary image of FIG. 3A.
Figure 3E:
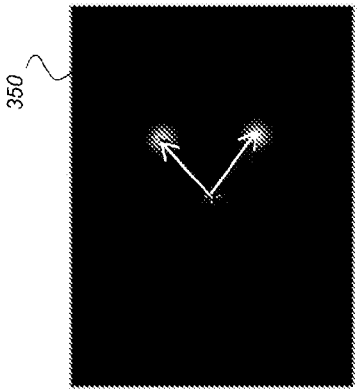
FIG. 3E shows the image of FIG. 3D having overlaid vertical and horizontal third-lines (i.e., power lines) according to the rule of thirds.
Figure 3F:
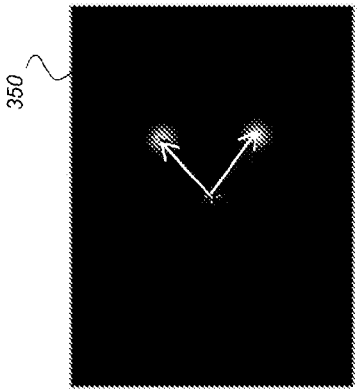
FIG. 3F shows a grayscale map representing a 2D photographic composition function defined based on the rule of thirds and determined for the traffic sign, where darker gray values represent low function values and brighter gray values represent high function values.

Reference is now made to FIGS. 3D-3F. FIG. 3D shows the exemplary image of FIG. 3A. FIG. 3E shows the image of FIG. 3D having overlaid vertical and horizontal third-lines (i.e., power lines) according to the rule of thirds. FIG. 3F shows a grayscale map of a 2D photographic composition function defined based on the rule of thirds and determined for the traffic sign, where darker gray values represent low function values and brighter gray values represent high function values.

In image 330 an object, a traffic sign (i.e., a feature) is detected. As shown in image 340, the object is located 0.2 of image 330 width to the right of the two right power points (intersections of the power lines), 0.16 of image 330 height above the lower power point and 0.16 under the upper power point, according to the rule of thirds. Two 2D Gaussian functions may be determined (i.e., photographic composition functions) having expected values which equal the locations indicated in image 340. Hence, the location property of this object feature is determined as a parameter of the photographic composition functions, i.e., as the expected values of the Gaussian functions. Grayscale map 350 may represent the determined Gaussian functions. One may see that the expected values of the functions are located 0.2 of image 330 width to the right, 0.16 of image 330 height above the center of image 330 and 0.16 of image 330 height below the center of image 330. Image 330 center is indicated in image 350 by "+".

Photographic composition functions may additionally represent a zoom of a camera (i.e., the angel of view of the camera). Such functions may be three-dimensional (3D) continuous or discrete functions (i.e., functions having arguments of a domain of three dimensions). Such functions may be indicated as: $f_i(x, y, z)$, where i represents an index of the functions. The argument (x, y, z) may represent, for example, a possible location for the center of an image of a desired scene (i.e., x and y) and a possible zoom factor for the image. The location of the center of the image reflects the alignment of the camera used to capture the image. The zoom factor of the image reflects the zoom (i.e., angle of view) of the camera used to capture the image. In some embodiments, the zoom argument may be represented with respect to the zoom of the camera used to capture the image, at the time of capturing (i.e., the actual zoom of the image). For example, such a zoom may receive negative values for zoom out, positive values for zoom in or zero value for no change in current zoom.

Thus, each rule may be defined as a collection of 3D photographic composition functions instead of 2D functions, where the third dimension is the zoom dimension. The value of the 3D photographic composition functions along the third dimension may be determined by the locations and sizes of features in the image as the image is zoomed out or zoomed in around the center of the image, according to a change in the zoom of the camera.

In some embodiments, the 3D photographic composition functions may be discrete functions. Such a 3D photographic composition function may be sampled at any number of discrete values of zoom. A collection of 2D functions may be extracted (by sampling the 3D function in discrete z values), where each 2D function represents an alignment of the camera as described above, but for a specific zoom factor. For example, three 2D functions may be used to define the zoom rule for a current image: a 2D function defined for the current zoom of the image (i.e., the reference zoom), a 2D function defined for the image with a 10% zoom in factor, and a 2D function defined for the image with a 10% zoom out factor.

Thus, a photographic composition function according to the disclosed techniques may be multidimensional, while the number of the dimension may be with respect to the number and type of characteristics of the image capturing or of the camera it represents.

In some embodiments, the image may be classified. Consequently, the photographic composition functions may be determined based on a set of rules which may be selected based on the classification of the image. This may reduce computational complexity. The classification of the image may be performed based on an extracted scene feature (i.e., according to step 110) or any other known image features (for example, Scale Invariant Feature Transform (SIFT), GIST (a set of scene features, see: http://ilab.usc.edu/siagian/Research/Gist/Gist.html, last accessed Jul. 10, 2014), Speeded Up Robust Features (SURF) and/or Local Binary Patterns (LBP)). The scene feature indicates the scene type of the image, such as beach, forest, mountain, party, city etc. Each composition rule may be reviewed in view of the scene types to determine its relevance to each scene type. Different sets of rules may be bundled together to create different context or scene aware rule sets. For example, a rule set which optimize composition in a party, on a beach, in a city scene etc.

For example, a beach scene usually may not include many vertical or diagonal lines. On the other hand, it may naturally include a significant horizontal line (i.e., the horizon). A rule set may be defined for a beach scene which may include the rule of thirds and may not include the rule of diagonals. Contrary to the above, a party scene may typically include people and faces. Lines (vertical and horizontal), on the other hand, although very common in such indoor location, may be much less important in this case. The lines in such a scene may result from walls, doors, furniture and so on. A suitable rule set for a party scene may not include the rule of thirds with respect to lines and the rule of diagonals.

In a step 130, a photographic composition sum-function may be defined by summing up at least some of the photographic composition functions. Any collection of photographic composition functions determined based on one rule or several rules, may be composed together by adding them and optionally re-normalizing the results to the range [0,1] to create a single function, such as the following 2D sum-function:

$$f(x, y) = \frac{1}{n} \sum_{i=1}^{n} f_i(x, y).$$

Figure 4:
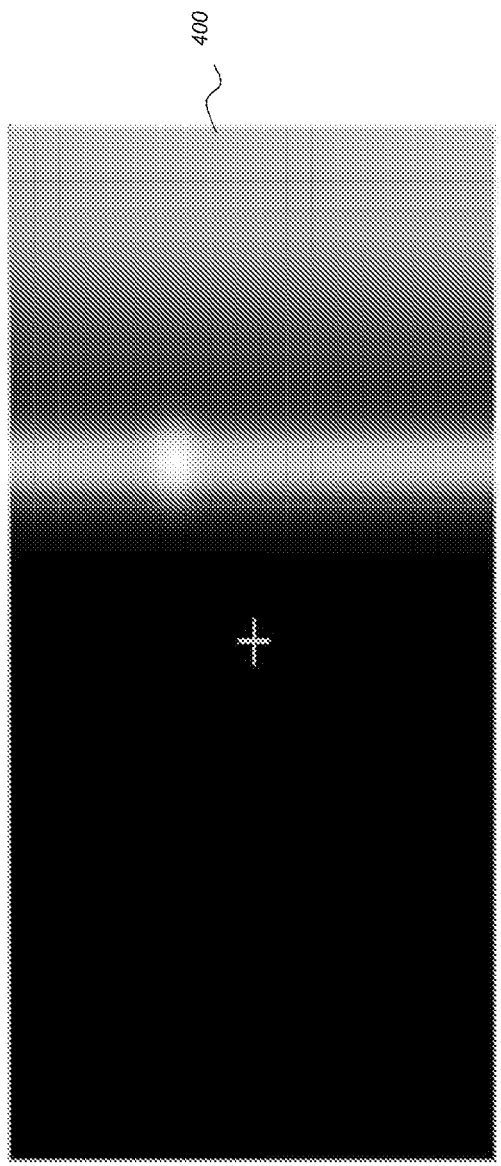
FIG. 4 shows a grayscale map representing a photographic composition sum-function of the 2D photographic composition functions mapped in FIGS. 2A-2C, where darker gray values represent low function values and brighter gray values represent high function values.

Reference is now made to FIG. 4, which shows a grayscale map of a photographic composition sum-function of the 2D photographic composition functions mapped in FIGS. 2A-2C, where darker gray values represent low function values and brighter gray values represent high function values. One may see that the value of the consolidated sum-function still may imply the extent in which moving the center of the frame to any (x,y) point of the image may improve the composition of the image.

In some embodiments, at least some of the photographic composition functions may be assigned weights in the sum-function. The weights may be based on a relative importance of the composition features for which the photographic composition functions are determined and/or of the composition rules on which the photographic composition functions are based. Since each photographic composition function is determined for one or more specific features and based on a specific rule, the relative weight of such a function in the sum-function may be based on the relative importance of each or both. Therefore, a 2D photographic composition sum-function including weights may be defined as follows:

$$f(x, y) = \frac{1}{\sum w_i} \sum_{i=1}^{n} w_i f_i(x, y)$$

where $w_i$ indicates the weights for each photographic composition function $f_i$.

In some embodiments, the classification of the scene may be used to determine the weights of the composition rules and/or composition features. Optionally, a set of rules may be determined for a scene type which may include a bundle of composition rules to be applied, features to be extracted and weights assigned to the composition rules and/or composition features. For example, a beach scene usually may not include many vertical or diagonal lines. On the other hand, it may naturally include a significant horizontal line (i.e., the horizon). A rule set may be defined for a beach scene which may include feature weights such that the weight assigned to horizontal lines is higher than the one assigned to the vertical lines. A party scene may typically include people and faces. Lines may be much less important. The relevant rule set for party scene may grant high importance to people and faces by assigning a high weight to such features, and almost no importance to lines by assigning a very low weight to such features.

In a step 140, an extremum of the photographic composition sum-function may be calculated. The extremum may reflect a photographic composition suggestion with respect to a photographic composition of the image.

For example, with reference to the 3D photographic composition sum-function described above, in both the discrete and continuous approach, the optimal 3D point of extremum may be extracted from the function by finding the absolute maximum in all three dimensions (regardless of the third dimension being discrete or continuous). If such a point is found with a zoom factor that is not zero, then the composition suggestion may include a zoom suggestion in addition to alignment suggestion (i.e., assuming the camera is not already optimally aligned).

In some embodiments, one or more indications to one or more points of interest or objects of interest in the image may be received, e.g., from a user (for example by using a touch screen) or as output of dedicated software. Further composition features relating to the one or more points of interest in the image may be then extracted.

In some embodiments, the received image is a preview image of a desired scene and the suggested photographic composition is calculated in real-time. A suggested photographic composition may be then calculated iteratively, each time another preview image of the desired scene is received.

In some embodiments, the photographic composition suggestion may be presented to a user of the camera. For example, if the user is a person, the received image may be displayed on a display and the photographic composition suggestion may be superimposed (namely, displayed as a visual graphical layer) on the displayed image. The presenting of the photographic composition suggestion to the user may be performed with respect to a current photographic composition of the image. For example, the suggestion may be presented in a form of instructions given to the user with respect to the current composition of the image. The user (e.g., a person or an automatic camera) may be instructed to move or rotate the camera to a certain direction or to increase or decrease the zoom of the camera. For example, the instruction to the user may be determined by defining a vector of a desired movement by the difference between the maximum point of the sum-function and the center of the image.

The instruction to the user may be precise, for example to double the zoom factor (i.e., with respect to a current zoom) or to set it to a certain value, or at what extent to move the camera in a certain direction. Since the calculation of the composition suggestion may be iterative, the actions of the user may be corrected in real-time until an optimal composition (with some predefined error) is received. For example, if the user is a person, the instructions may be displayed to the user as visual graphic marks overlaid on the image, such as an arrow pointing towards a desired direction of camera movement or arrows pointing in or out to indicate zoom in or zoom out actions and/or as text (i.e., written instructions). Alternatively or additionally, the instructions may be verbal, audibly provided by a speaker.

For example, a center of the image and a center of the image according to the composition suggestion (i.e., a desired center) may be indicated both on the captured image (e.g., one may be indicated by "x" and the other by a circle that should circumscribe the "x" mark). Once the user moves the camera, the desired center may move accordingly. The user may then aim to unite both centers and by that achieve the desired alignment of the camera. The same may be done with respect to tuning the zoom of the camera.

If the user is an automatic platform, such as an automatic camera, the instructions (or the photographic composition suggestion) may be transferred to the automatic platform in order, for example, to change a camera alignment and zoom. A robotic platform may manipulate the camera alignment and zoom, e.g., by a robotic arm.

In some embodiments, the calculated composition suggestion may be used in order to notify a computerized device (e.g., a smartphone or a laptop computer) of a good composition. In such embodiments, the composition suggestion is used to detect when a photographic composition is of a good quality. For example, a wearable device which includes a camera which may continually sample its field of view. The disclosed techniques may be applied on the sampled images (i.e., preview images) until a current preview image is found to match the composition suggestion. If the computerized device includes a camera, the computerized device may then capture and optionally save the current preview image.

With reference to FIGS. 2A, 2B and 2C, the value of the 2D photographic composition functions at a point (x, y) in the map may be a number between zero and one that implies the extent in which moving the center of the image to that (x, y) point may improve the composition of the image. The Figures show grayscale maps of three such 2D functions representing possible translations of the camera: the function mapped in map 200 suggests that moving the camera to the right in general may improve the composition. The function mapped in map 210 suggests that moving the camera exactly by x pixels to the right may improve the composition of the image. The function mapped in map 220 suggests that moving the camera exactly x pixels to the right and y pixels upwards may improve the composition of the image.

In some embodiments, the disclosed systems, methods and computer program products may be used with a pre-acquired image (i.e., the received image) in a post-processing phase, in order to produce a more aesthetic image by cropping the image. In such applications, an initial crop of the image may be determined in one of the following manners: semi-randomized, manual, object biased and/or saliency biased.

Semi-randomized crop may be performed by randomly selecting an initial crop of the received image, which may include large portion of the image. Manual crop may be performed by a user which may select the initial crop by using an input device (e.g., a touch screen or a mouse). Object biased may be performed by software which automatically defines a crop. The crop may be defined such that it may include objects detected in the image (e.g., faces, people, animals and the like). The objects may be detected by known methods and algorithms, for example, as described herein above. Saliency biased crop may be performed by software which automatically defines a crop. The crop may be defined such that it may include salient regions in the image. This may be performed by algorithms as known in the art and for example, as described herein above.

In a further step, the disclosed techniques may be applied on the cropped image to receive a composition suggestion. The composition suggestion may be then applied by cropping the image according to the suggestion. These techniques may be applied iteratively on the image thus performing an iterative crop. In each iteration the currently cropped image is received as input and the output suggestion may be used to define the next crop. The iterations may be stopped once a current crop achieves the composition suggestion.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a continuous stream of images; and
   in real time, for each image of at least some of the images, operating at least one hardware processor to automatically:
   (a) extract composition features from the image,
   (b) determine photographic composition functions for at least some of the extracted composition features based on a plurality of composition rules,
   (c) define a photographic composition sum-function by summing up at least some of the photographic composition functions, and
   (d) calculate an extremum of the photographic composition sum-function, wherein the extremum reflects a photographic composition suggestion with respect to a photographic composition of the image.

2. The method of claim 1, further comprising using the at least one hardware processor for presenting the photographic composition suggestion to a user.

3. The method of claim 2, wherein the presenting of the photographic composition suggestion to the user comprises superimposing the photographic composition suggestion on one or more of the images.

4. The method of claim 2, further comprising using said at least one hardware processor for classifying the image by a scene type.

5. The method of claim 1, wherein the photographic composition suggestion comprises a suggestion with respect to characteristics of a camera used to capture the image, wherein the characteristics are selected from the group consisting of: a zoom of the camera, an alignment of the camera and a rotation of the camera.

6. The method of claim 1, wherein each of the photographic composition functions is based on a composition rule of the plurality of the composition rules and is determined for one or more composition features of the at least some of the extracted composition features.

7. The method of claim 1, further comprising using said at least one hardware processor for receiving one or more indications as to one or more points of interest in the image, and wherein the extracting of composition features further comprises extracting composition features relating to the one or more points of interest in the image.

8. The method of claim 1, wherein rules of the plurality of composition rules are selected from the group consisting of: the rule of thirds, the rule of diagonals, the rule of space, the rule of golden ratio, the rule of secondary diagonals, the rule of centered composition and the rule of symmetric composition.

9. The method of claim 1, wherein the photographic composition functions comprise continuous functions.

10. The method of claim 1, wherein the defining of the photographic composition sum-function comprises assigning the at least some of the photographic composition functions with weights, wherein the weights are based on a relative importance of elements selected from the group consisting of: (a) the composition features for which the photographic composition functions are determined, and (b) the composition rules on which the photographic composition functions are based.

11. The method of claim 1, further comprising using said at least one hardware processor for downsampling the image.

12. A computer program product comprising a non-transitory computer-readable storage medium having program code embodied therewith, the program code executable by at least one hardware processor to automatically:
   receive a continuous stream of images; and
   in real time, for each image of at least some of the images:
   (a) extract composition features from the image,
   (b) determine photographic composition functions for at least some of the extracted composition features based on a plurality of composition rules,
   (c) define a photographic composition sum-function by summing up at least some of the photographic composition functions, and
   (d) calculate an extremum of the photographic composition sum-function, wherein the extremum reflects a photographic composition suggestion with respect to a photographic composition of the image.

13. The computer program product of claim 12, wherein said program code is further executable by said at least one hardware processor to present the photographic composition suggestion to a user.

14. The computer program product of claim 12, wherein the photographic composition suggestion comprises a suggestion with respect to characteristics of a camera used to capture the image, wherein the characteristics are selected from the group consisting of: a zoom of the camera, an alignment of the camera and a rotation of the camera.

15. The computer program product of claim 12, wherein said program code is further executable by said at least one hardware processor to classify the image by a scene type, and wherein the plurality of composition rule is a set of rules corresponding to the scene type.

16. The computer program product of claim 12, wherein the defining of the photographic composition sum-function comprises assigning the at least some of the photographic composition functions weights, wherein the weights are based on a relative importance of elements selected from the group consisting of: (a) the composition features for which the photographic composition functions are determined, (b) and the composition rules on which the photographic composition functions are based.

17. A computerized device comprising:
a camera; and
a hardware processor configured to, automatically:
(a) receive a continuous stream of images;
(b) in real time, for each image of at least some of the images:
a) extract composition features from the image,
b) determine photographic composition functions for at least some of the extracted composition features based on a plurality of composition rules,
c) define a photographic composition sum-function by summing up at least some of the photographic composition functions, and
d) calculate an extremum of the photographic composition sum-function, wherein the extremum reflects a photographic composition suggestion with respect to a photographic composition of the image.

18. The computerized device of claim 17, wherein each of the photographic composition functions is based on a composition rule of the plurality of the composition rules and is determined for one or more composition features of the at least some of the extracted composition features.

19. The computerized device of claim 17, further comprising a display, wherein the presenting of the photographic composition suggestion to the user comprises superimposing the photographic composition suggestion on one or more of the images displayed on the display.

20. The computerized device of claim 17, wherein:
the hardware processor is further configured to present the photographic composition suggestion to a user; and
the photographic composition suggestion comprises a suggestion with respect to characteristics of a camera used to capture the image, and wherein the characteristics are selected from the group consisting of: a zoom of the camera, an alignment of the camera and a rotation of the camera.

* * * * *